US011910903B2

(12) United States Patent
Edwards

(10) Patent No.: US 11,910,903 B2
(45) Date of Patent: Feb. 27, 2024

(54) CONTAINERS FOR FRAGRANCES

(71) Applicant: Viviana London Limited, Stevenage (GB)

(72) Inventor: Michael Edwards, Stevenage (GB)

(73) Assignee: Viviana London Limited, Stevenage (GB)

( * ) Notice: Subject to any disclaimer, the term of this patent is extended or adjusted under 35 U.S.C. 154(b) by 39 days.

(21) Appl. No.: 16/614,555

(22) PCT Filed: May 15, 2018

(86) PCT No.: PCT/GB2018/051304
§ 371 (c)(1),
(2) Date: Nov. 18, 2019

(87) PCT Pub. No.: WO2018/211253
PCT Pub. Date: Nov. 22, 2018

(65) Prior Publication Data

US 2020/0178671 A1 Jun. 11, 2020

(30) Foreign Application Priority Data

May 17, 2017 (GB) ..................................... 1707924

(51) Int. Cl.
*A45D 34/02* (2006.01)
*B05B 11/10* (2023.01)
*A45D 34/00* (2006.01)
*B05B 11/00* (2023.01)

(52) U.S. Cl.
CPC .......... *A45D 34/02* (2013.01); *B05B 11/1047* (2023.01); *A45D 2034/002* (2013.01); *A45D 2200/057* (2013.01); *B05B 11/0037* (2013.01); *B05B 11/0078* (2013.01); *B05B 11/1084* (2023.01)

(58) Field of Classification Search
CPC .............. A45D 34/02; A45D 2034/002; A45D 2200/057; B05B 11/3047; B05B 11/0037; B05B 11/0078; B05B 11/3084; B05B 11/1047; B05B 11/0081; B05B 11/00; B05B 12/1418; B05B 12/1409; B05B 7/2472; B05B 7/24
USPC ...... 222/321.2, 132, 144.5, 135, 134, 142.4, 222/142.5, 142.6, 145, 5
See application file for complete search history.

(56) References Cited

U.S. PATENT DOCUMENTS 3,596,802 A * 8/1971 Feldman ................ B65D 83/68
222/144.5
4,006,841 A * 2/1977 Alticosalian ......... B65D 83/205
222/145.5

(Continued)

*Primary Examiner* — Lien M Ngo
(74) *Attorney, Agent, or Firm* — The Weintraub Group; Arnold S. Weintraub

(57) ABSTRACT

A container unit (2) including a plurality of sub-container portions (4) defining a plurality of chambers for containing a liquid substance, a mixing chamber (10) downstream of the sub-container portions, a selecting mechanism for selecting one or more liquid substances from the sub-container portions, and a spray actuator (6) for dispensing a single liquid substance product from one sub-container portion or a mixture of liquid substances from two or more of the plurality of sub-container portions (4), wherein the sub-container portions (4) are individually removable from the container unit.

16 Claims, 5 Drawing Sheets

(56) References Cited

U.S. PATENT DOCUMENTS

| | | | | |
|---|---|---|---|---|
| 4,549,674 | A * | 10/1985 | Alticosalian | B65D 83/205 222/336 |
| 2003/0062385 | A1 * | 4/2003 | Engel | A45D 34/04 222/145.8 |
| 2016/0068383 | A1 * | 3/2016 | Falco, III | B67D 1/0888 222/25 |
| 2016/0199864 | A1 * | 7/2016 | Quennessen | B05B 11/3084 222/135 |

* cited by examiner

CONTAINERS FOR FRAGRANCES

This invention relates to a container and particularly to a container for fragrances which are sprayed.

According to the present invention, there is provided a container unit including a plurality of sub-container portions defining a plurality of chambers for containing a liquid substance, a mixing chamber downstream of the sub-container portions, a selecting mechanism for selecting one or more liquid substances from the sub-container portions, and a spray actuator for dispensing one or more of the liquid substances from one or more of the respective sub-container portions, wherein the sub-container portions are removable from the container unit.

Owing to this aspect, the sub-container portions are able to be replaced and recycled.

In order that the present invention can be completely understood, reference will now be made, by way of example only, to the accompanying drawings, in which:-

Figure 1:
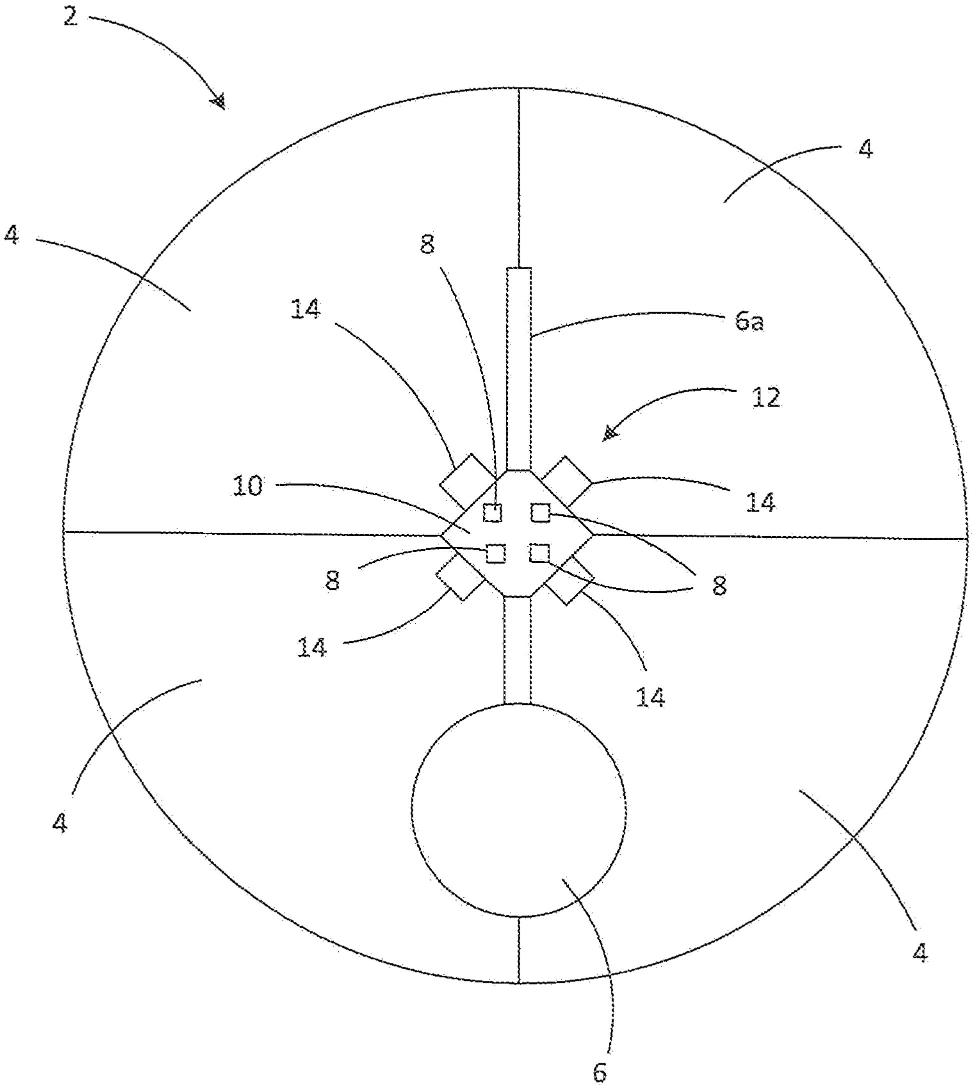
FIG. 1 shows a schematic view from above of a fragrance container comprising sub-container portions.

Referring to FIG. 1, a spherical container unit 2 comprises a plurality of sub-container portions 4, four such container sub-portions being shown, which form substantially equal chambers in which fragrant liquids, preferably different to each other, are stored. At the top end of the container unit 2 there is a spray actuator 6 having an outlet nozzle 6*a*, the actuator 6 being hand-powered or electrically powered.

A corresponding number of narrow diameter dip tubes 8 extend into the plurality of sub-container portions 4, with their respective lower end regions submerged in the liquid substance and their respective upper end regions connected to a mixing chamber 10. Once the actuator 6 is operated, one or more liquid substances from the sub-containers 4 exit the sub-containers via the respective dip tube(s) 8 into the mixing chamber 10, where if liquid substances from more than one sub-container 4 meet, they form a mixture to be sprayed through the outlet nozzle 6*a* of the actuator 6.

A selecting mechanism 12 located operably between the sub-container portions 4 and the mixing chamber 10 enables selection of the desired sub-containers 4 in order to allow either a single liquid fragrance substance to be sprayed through the outlet nozzle 6*a* or a mixture of liquid fragrance substances to be sprayed through the outlet nozzle 6*a*. Such a selecting mechanism can be in the form of a manually or automatically operable selectable valve device, for example, a simple push button 14 to close off the top end region of one or more the dip tubes 8, each dip tube 8 having its own push button 14, as shown. Thus, in order to be able to spray a single fragrance, the buttons 14 of three of the four sub-containers 4 are pushed to close-off the respective dip tubes 8. Similarly, fewer buttons 14 can be used to close-off fewer dip tubes 8 to result in a mixture of fragrances from different sub-containers 4 can be sprayed.

The push buttons 14 may act against a compression spring so that, when in a closed-off position, upon a further depression, the dip tube is open for use. Alternatively, each button may be a simply sliding mechanism slidable between an open and a closed position.

There could be sub-containers 4 of differing internal volumes depending, for instance, upon the different fragrances to be stored therein.

The sub-containers 4 are removable from the container unit 2 as a whole so that they can be replaced and recycled. In this way, the same fragrances can be refreshed or new combinations of fragrances can be arranged. This very advantageous arrangement enables freedom of choice and experimentation of different combinations of fragrances and allows the replacement of favourite fragrances and fragrance combinations. The container unit 2 may include some form of framework (not shown) to enable the sub-container portions 4 to be sufficiently held together or the individual container sub-portions 4 comprise means for connecting to an adjacent sub-portion 4.

One type of mechanism of forming the output mist of one or fragrances is preferably by way of the spray actuator 6 causing a stream of fluid, preferably air, to move along a conduit, in the form of, for example, a narrow tube, across a small opening at the top end region of the or each dip tube 8 where it is forced to follow a curved path up and over the top of the or each dip tube. This curved path creates a lower pressure on the inside of the curve at the top of the or each dip tube 8. The difference between the reduced pressure at the top of the or each dip tube 8 and the higher atmospheric pressure existing inside the or each sub-container 4 pushes the liquid up the or each dip tube 8 and into the moving stream of air where it is broken up into small droplets and carried away with the stream of air. Thus, for example, if the container 2 comprised four sub-containers 4 as shown, each with its respective dip tube 8 at the top end of which is an opening it would be possible to cause, upon actuation of the spray actuator 6 (either manually or automated), a stream of air to flow across all four openings which would result in a mixture of the fragrances in each of the four sub-containers 4. Advantageously, the selecting mechanism enables the opening and closing of the individual dip tubes 8 in order to be able to select any desired combination of the fragrances in each of the sub-containers 4. This would allow a user to mix in the case of four sub-containers 4 fifteen variations of fragrance. The sub-portions 4 are detachable and can be replaced to account for higher usage of a preferred fragrance.

Figure 2:
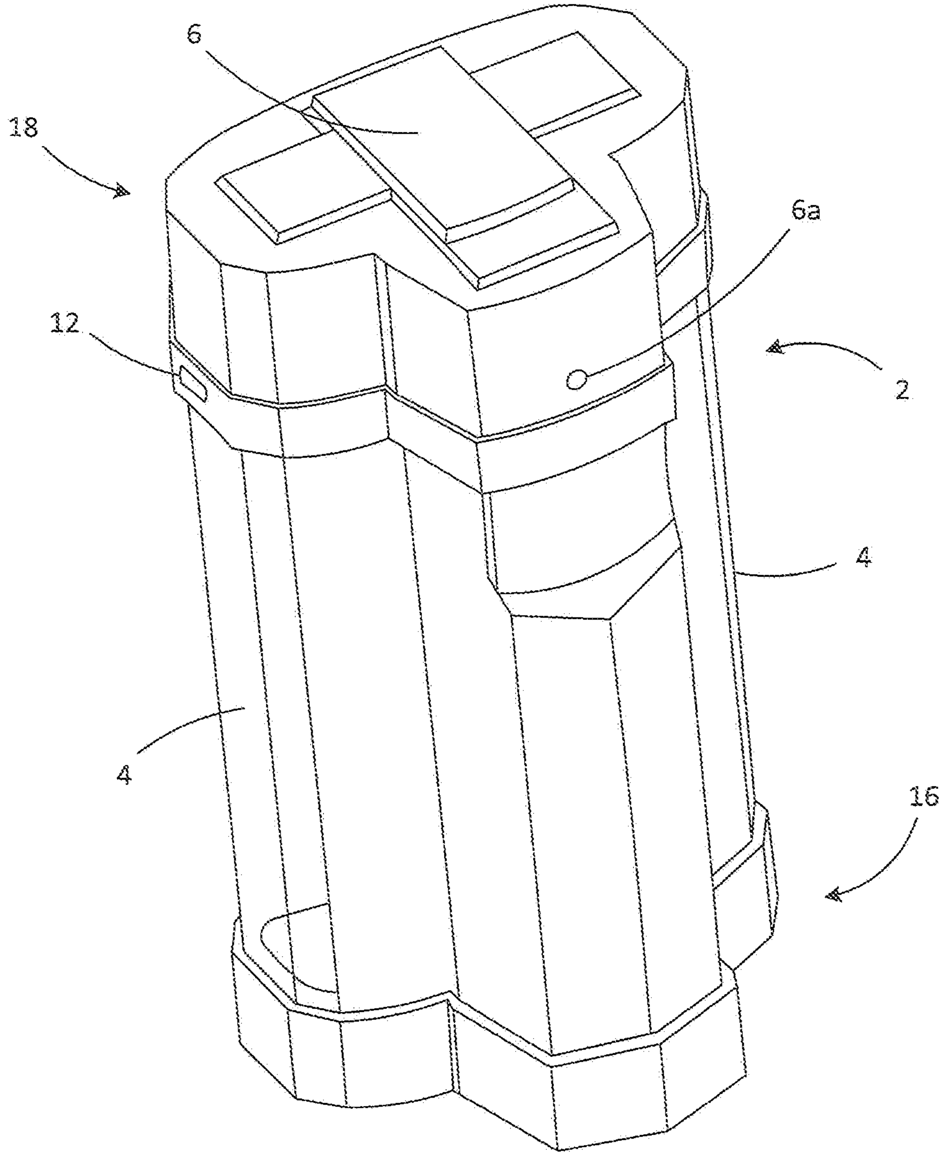
FIG. 2 shows a perspective view of a preferred embodiment of the fragrance container.

Referring to FIG. 2, the container unit 2 of a preferred embodiment comprises a base portion 16 in which the sub-container portions 4 (two of three sub-containers 4 being shown) are retained. The sub-container portions 4 are also retained by a lid or head portion 18, on top of which the spray actuator 6 is located and on the front side edge the spray nozzle 6*a* is located. The lid portion also includes the selecting mechanism 12, which takes the form of a switch device for each sub-container portion 4 for simply selecting an on or off position.

Figure 3:
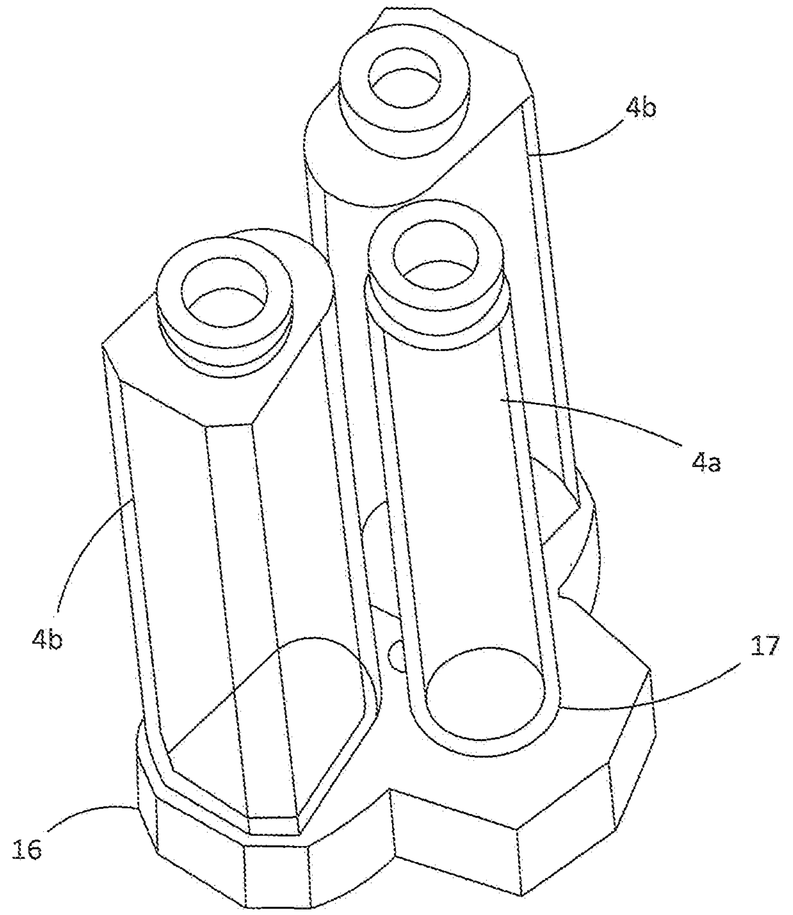
FIG. 3 shows a perspective view of the inside of the fragrance container of FIG. 2 showing a plurality of sub-container portions.

FIG. 3 shows the base portion 16 of the container unit 2 of FIG. 2 retaining three sub-container portions 4 located in respective receiving cavities 17 recessed into the base 16. There are shown two different sizes sub-container portions 4; a forward first sub-container portion 4*a* of a first shape, the one shown being substantially circular cylindrical cross-section and a pair of rearward second sub-container portions 4*b* of a second shape, the ones shown being of a different cross section to the forward sub-container portion 4*a*. Any suitable shape can be chosen. Alternatively all three sub-container portions 4 could be of the same shape and size. In relation to the embodiment shown in FIG. 3 with the different shaped bottles, the first and second sub-container portions 4 can have a different volumetric capacity of respective fragrances, so that, for example, a more concentrated, stronger fragrance can be contained in the smaller first sub-container portion 4*a*.

Figure 4:
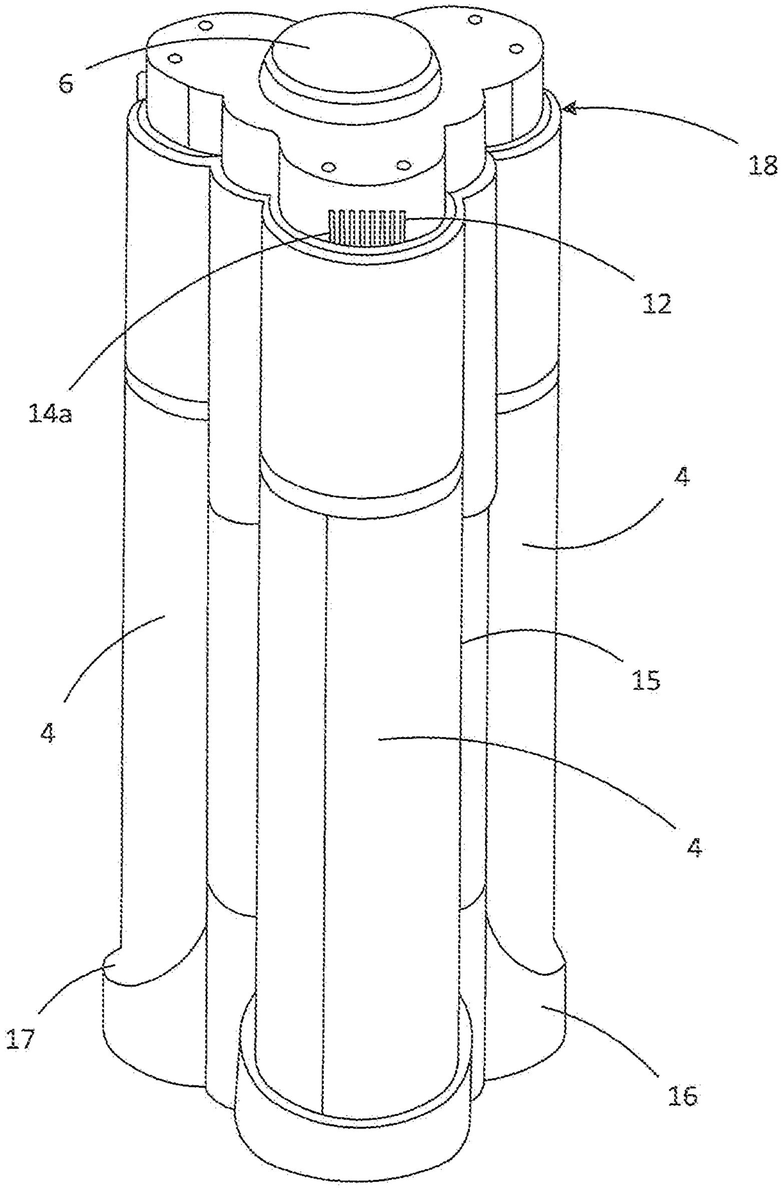
FIG. 4 is a perspective view of an alternative version of the fragrance container.

Referring to FIG. 4, the internal parts of the of the container unit 2 is shown where all three sub-container portions 4 are the same shape and size and retained by the receiving cavities 17 of the base portion 16. Located above the sub-container portions are internal parts of the lid portion 18 which can be seen to include the spray actuator 6 and the selecting mechanism 12 including a respective switch device 14*a* for each sub-container portion 4 which is movable from an 'on' position in which the fragrance in the respective sub-container portion 4 is selected and an 'off' position. The framework 15 of the container unit 2 also assists in holding the sub-container portions in place.

Figure 5:
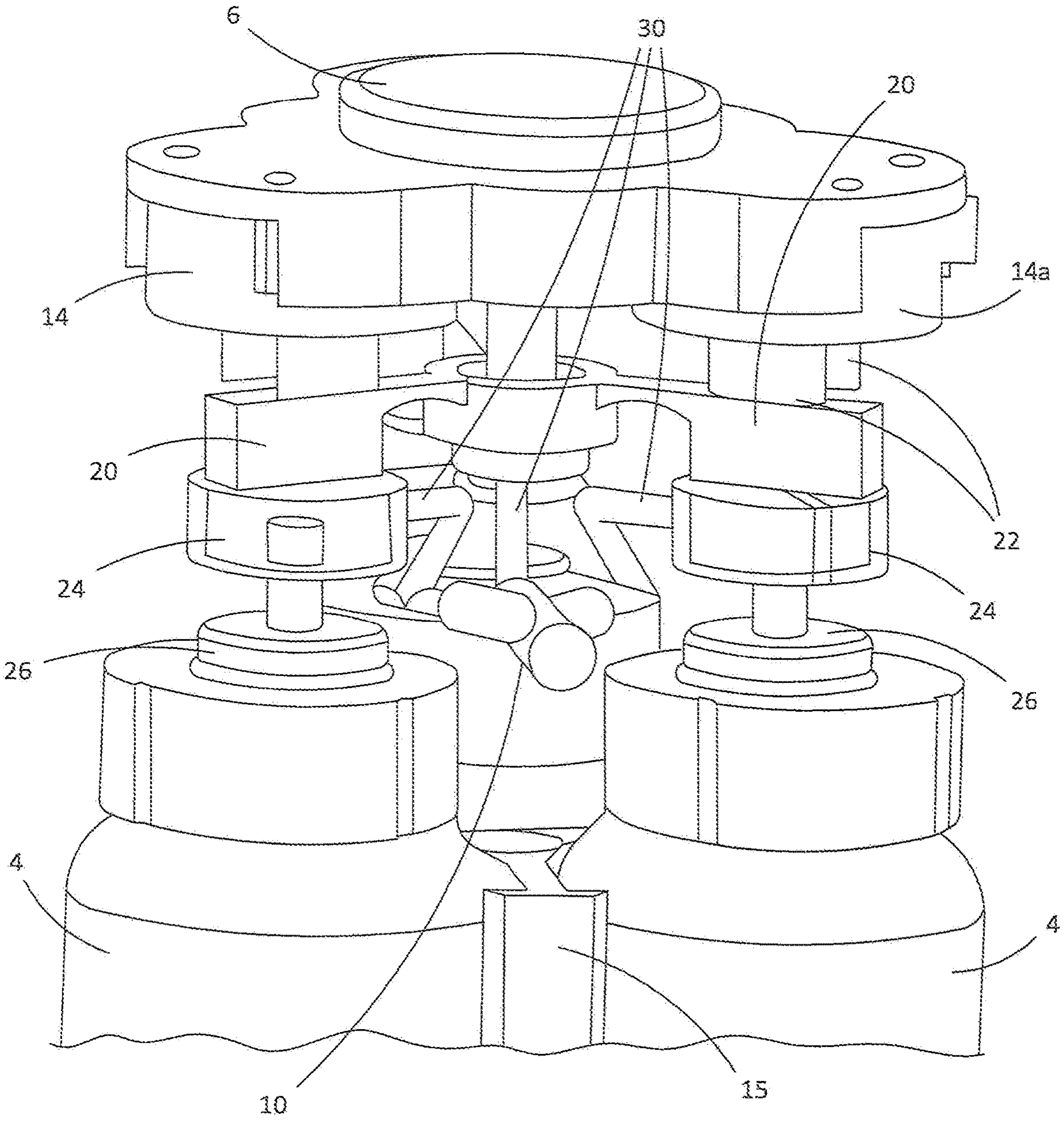
FIG. 5 shows a perspective view of the detail of the spray mechanism of the fragrance container.

FIG. 5 shows in detail the spray mechanism of the container unit 2 located within the lid portion 18. The spray actuator 6 is in the form of a spray button plate section of which only the uppermost circular button is visible in the finished container unit 2, which when pressed downwardly causes the selecting mechanism 12 to either act or not act upon respective actuator units 20. The selecting mechanism comprises the switch devices 14*a* which each have on their undersides a pair of downwardly projecting fins 22 spaced apart from each other of a distance slightly greater than the width of the respective actuating unit 20 so that when the switch device 14*a* is in the 'off' position and the spray actuator 6 is pressed the pair of fins 22 pass on either side of the actuator unit 20 and therefore to do actuate the fragrance to exit from the respective sub-container portion 4. However when the switch device 14*a* is placed into the 'on' position the switch device 14*a* is rotated about an axis through, for example, approximately 90 degrees which also causes the pair of fins 22 to rotate by the same amount such that now as the spray actuator 6 is pressed, the bottom edges of the fins 22 press downwardly against the actuator units 20. This causes a downward movement of the selected actuator unit(s) 20 in order to disperse a quantity of the fragrance in the sub-container portion 4 into a chamber 24 by causing operation of a pre-compression pump 26.

The operation of the pair of fins 22 is based on cams for robust longevity of the device, allowing reuse as sub-container portions 4 are removed and replaced.

Each pre-compression pump 26 allows for extremely low activation pressure to reduce the finger pressure required on activation and to maintain the dosage and mix irrespective of how fast or slow the button 6 is pushed and produces consistent dosage sizes. The pre-compression pumps 26 are fixed into the sub-container portions 4 (or 4*a* and 4*b*) and couple with the respective chambers 24 when inserted into the lid portion 18.

The spray mechanism of the present invention meters a mix of fragrances consistently so that when switching between seven combinations of three sub-container portions 4, the ratio of the mix is substantially constant, so that with two fragrances selected as an example the mixture will always smell substantially the same. The consistency is achieved by the pre-compression pump 26 which draws a measured amount in the mixing of the 2 fragrances, the ratio being substantially 50:50 and in the case of all 3 to be mixed the ratio is approximately one third of each fragrance that is pumped into a manifold 28 linked to each pre-compression pump 26 by flexible tubes 30 and mixed in the mixing chamber 10 immediately before they are sprayed through the spray nozzle 6*a*. In this way, the manifold 28 serves to both the linking and blending the fragrances. Such consistency in the dosage is achieved by the combination of the manifold 28 and the pre-compression pumps 26.

The dosage may, alternatively be metered in such a way, either manually or electronically, that an unequal mix is achieved; for example 10% of a first fragrance, 50% of a second fragrance and 40% of a third fragrance. One advantageous way of providing such a mix is for the switching mechanism to be electronically controlled with a software application stored in the memory of an electronic computer device such as a smartphone or tablet computer, whereby the switching mechanism may include one or more metering pumps such as solenoid operated pumps. In this way, a user can input the particular fragrances present in the container unit 2 and control exact mixtures by programming a desired mixture into the software application, which is then communicated either wirelessly or via a wired connection to the selecting mechanism. That particular programmed mix can then be sprayed from the container unit 2. The software application may also provide suggested mixtures according to, for example, the season or time of the year.

Each sub-container portion 4 is removable from the container unit 2 and as such are rechargeable with replacement sub-container portions. This is very advantageous where, for instance, a user prefers one type of mix that will cause certain sub-container portions 4 run out quicker than others. If the user could not replace the sub-container portions then there could be far more waste than necessary. As such the container unit 2 is 're-usable'.

The base portion 16 advantageously includes a locking device for securing the base portion 16 to the framework 15, which when unlocked, by hand or with a key device, enables removal of the base portion to gain access to each sub-container portion 4 or 4*a* and 4*b* for replacing.

A further advantageous feature arises in the provision of separate container units 2 for males and females. As a result, male fragrance refill sub-container portions 4 do not fit the container unit 2 for female fragrances and vice versa. Therefore, a potentially harmful non-tested mix, from a stability point of view, cannot be made. So, there is a male-specific bottle type and a female-specific bottle type, which have, in addition, been designed so that male fragrance dip tubes attached to the pre-compression pumps 26 do not fit the female bottle and vice versa.

I claim:

1. A container unit including a plurality of sub-container portions defining a plurality of chambers for containing a liquid substance, a mixing chamber downstream of the sub-container portions, a selecting mechanism for selecting, between an on or off position, one or more liquid substances from the sub-container portions, and a spray actuator unit for dispensing a single liquid substance product from one sub-container portion or a mixture of liquid substances from two or more of the plurality of sub-container portions according to the selecting mechanism, wherein the selecting mechanism includes respective switch devices for each sub-container portion and the spray actuator includes a spray button plate section, which when pressed downwardly causes the respective selecting mechanism to either act or not act upon respective actuator units for each sub-container portion and wherein the sub-container portions are individually removable from the container unit.

2. A container unit according to claim 1, wherein said selecting mechanism is a manually operable selectable valve device.

3. A container according to claim 2, wherein the manually selectable valve device includes a push button.

4. A container unit according to claim 1, wherein said selecting mechanism is an automatically operable selectable valve device.

5. A container unit according to claim 4, wherein the selecting mechanism is electronically controlled by way of a software application stored on an electronic computer device.

6. A container unit according to claim 1, wherein each switch includes a pair of downwardly projecting fins which act upon the actuator unit when the switch device is in an on position.

7. A container unit according to claim 1, wherein the sub-container portions are of differing internal volumes.

8. A container unit according to claim 1, wherein the sub-container portions are different shapes.

9. A container unit according to claim 8, wherein a first sub-container portion is a first shape and a pair of other sub-container portions are a second shape.

10. A container unit according to claim 8, wherein the different shape containers have differing internal volumes.

11. A container unit according to claim 1, and further comprising a pre-compression pump attached to each sub-container portion.

12. A container unit according to claim 11, wherein the actuator unit serves to actuate the pre-compression pump when the switch device is in the on position.

13. A container unit according to claim 1, and further comprising a manifold connected to each sub-container portion and serving to both link and blend the liquid substances.

14. A container unit according to claim 1, and further comprising a framework to hold together the sub-container portions, a base portion in which a bottom end region of the sub-container portions are retained, wherein the base portion includes a locking device for securing the base portion to the framework, which when unlocked, enables removal of the base portion to gain access to each sub-container portion.

15. A container unit according to claim 1, wherein the container sub-portions comprise means for connecting to an adjacent container sub-portion.

16. A container unit according to claim 1, wherein different ones of the container unit define fragrance container units for males or females, and wherein, the sub-container portions of the fragrance container unit for a male are of a different size and/or shape and do not fit the container unit for the female fragrance container unit.

* * * * *